Patented Sept. 18, 1923.

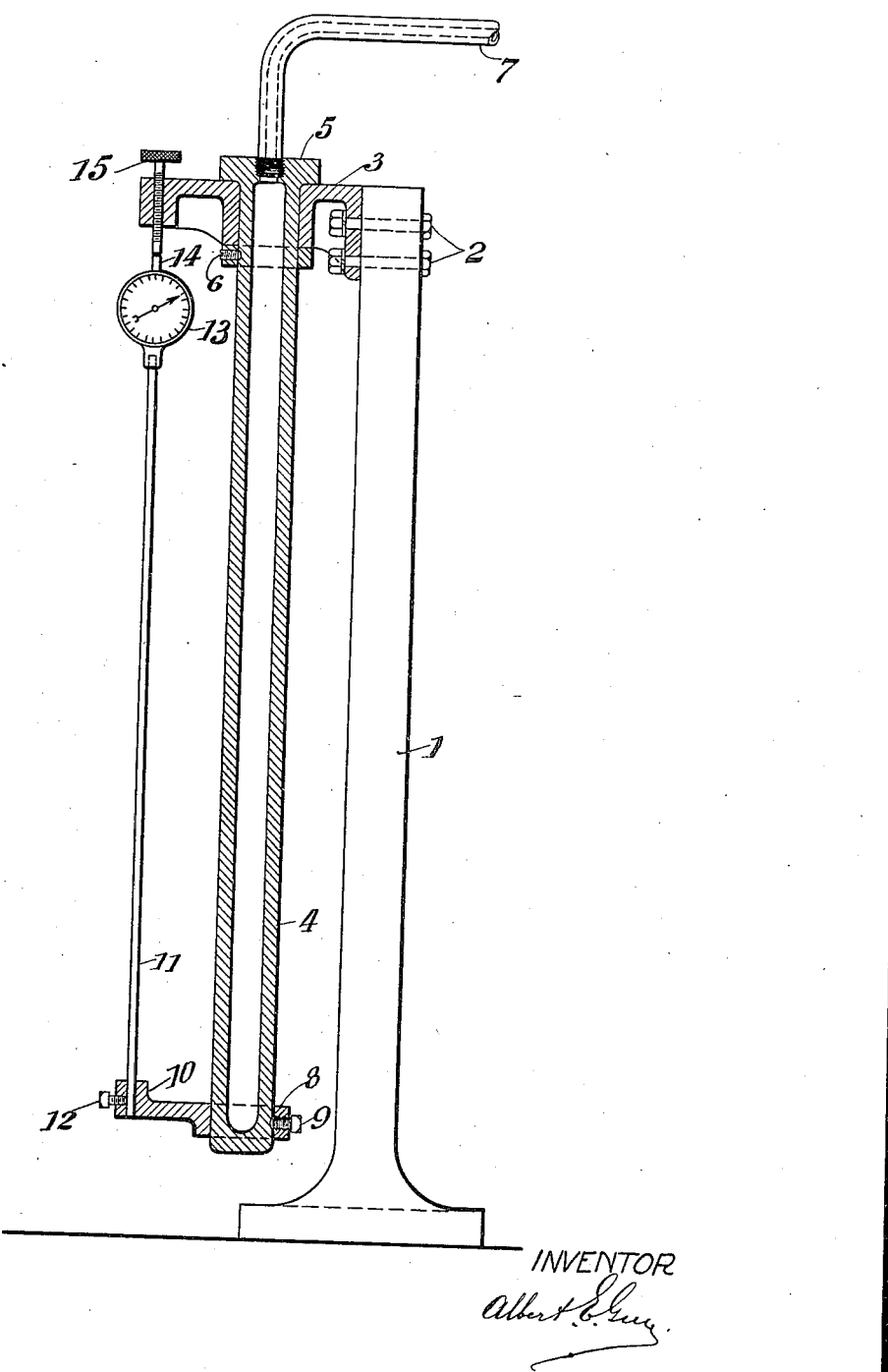

1,468,383

UNITED STATES PATENT OFFICE.

ALBERT E. GUY, OF THE UNITED STATES ARMY.

PRESSURE GAUGE.

Application filed September 21, 1921. Serial No. 502,297.

(FILED UNDER THE ACT OF MARCH 3, 1883, 22 STAT. L., 625.)

*To all whom it may concern:*

Be it known that I, ALBERT E. GUY, major, Ordnance Department, United States Army, a citizen of the United States, stationed at Aberdeen Proving Ground, Aberdeen, Maryland, have invented an Improvement in Pressure Gauges, of which the following is a specification.

The invention described herein may be used by the Government, or any of its officers or employees, in prosecution of work for the Government, or by any other person in the United States, without payment to me of any royalty thereon, in accordance with the act of March 3, 1883.

The subject of this invention is a pressure gauge intended, primarily, for measuring exceedingly high fluid pressures.

While I am aware that pressure gauges are old and well known, I am of the opinion that no satisfactory gauge has been devised for measuring exceedingly high pressures, such, for instance, as those used in the treatment of gun tubes for distending and setting or compacting the metal therein.

In providing a gauge of this character it is essential that the material of which the gauge is composed will be capable of withstanding the high pressures to which it is subjected and that the actual elastic limit of such material will not be reached when such pressures are applied thereto, but that the material will respond to such pressures in a uniform and predetermined manner and will, when relieved of the pressure, assume its original form and proportions.

These ends I attain by providing a comparatively thick walled cylinder which has been subjected to pressures during working such as will distend the material of the cylinder beyond its natural elastic limit, thereby setting the material in such distended form and increasing the elastic limit thereof.

The objects of the invention are further attained by providing a gauge in which pressures are measured by the axial or linear elongation of the cylinder.

With these and other objects in view, my invention consists in the novel arrangement and combination of parts and in the details of construction and manufacture herein described and claimed, it being understood that changes in the precise embodiment of the invention herein disclosed may be made without departing from the spirit of the invention.

A practical embodiment of the invention is illustrated in the accompanying drawing, wherein the figure is an elevation, partly in longitudinal section, of a gauge constructed in accordance with the invention.

Referring to the drawing by numerals of reference:

I have provided a standard or support 1, to the upper end of which is secured, as by bolts 2, a bracket 3. The bracket 3 is apertured to receive with a binding fit, the pressure tube or cylinder 4, which may be held suspended in the bracket by having a flange or collar 5 formed on its upper end. A set screw 6 may be further employed if desired for binding the cylinder in place. The upper end or head of the cylinder 4 is apertured and threaded to receive the threaded end of the pipe 7, through which pressure fluid is supplied to the cylinder.

The cylinder 4 is specially constructed to withstand high pressures and to this end I prefer to first work the cylinder with high pressures which distend the material of the cylinder beyond its elastic limit, thus raising the elastic limit beyond the natural limit of the metal of which it is composed or constructed. With a cylinder so constructed any pressure below the maximum pressure originally applied may be supplied to the cylinder without causing new permanent deformation of the metal of the cylinder.

When pressure fluid is applied to the cylinder through the pipe 7 a distortion of the cylinder takes place both radially or laterally and axially. The axial distortion causes the cylinder to elongate and it is this elongation of the cylinder that is made use of in measuring the pressure.

In order that the elongation or axial expansion of the cylinder may be noted, a collar 8 encircles the lower end of the cylinder with a close binding fit and may be further bound in place thereon by a set screw 9. The collar is provided with a radially extending lug 10, apertured to receive one end of a rod 11, which may be bound therein in any suitable manner, as by means of a set screw 12. To the other end of the rod 11 is secured an indicating dial 13 provided with an operating rod 14 the free end of which is contacted by an adjusting member, such as the adjusting screw 15, threaded through a threaded aperture formed in an extension of the bracket 3. The adjusting screw 15 may be threaded in or out to properly set the indicator so that the readings thereof, when pressure is applied to the cylinder, may be correct.

In practice the device is operated in the following manner.

The adjusting screw 15 is turned in or out as the need may be to bring the pointer on the indicator dial to zero setting. The fluid, the pressure of which is to be measured is then admitted to the interior of the cylinder through the pipe 7 causing distension and elongation of the cylinder. As the cylinder elongates the rod 11 and indicator 13 are moved away from the end of the adjusting screw 15, thereby allowing the operating rod 14 to extrude further from the casing of the indicator under the operation of suitable mechanism contained in the casing, which causes the pointer on the indicator to rotate on its pivot through a sufficient angle to point to that graduation corresponding to the pressure within the cylinder. When the pressure is relieved, the cylinder, because of the elasticity of the material, will assume its normal proportions.

Having described my invention, what I claim, is:

1. A pressure gauge, including a support, a bracket secured to the support, said bracket being apertured, a cylinder inserted through the aperture in the bracket and hung from the bracket, said cylinder formed with a peripheral annular flange at its upper end and resting on the bracket, a collar encircling the cylinder at its lower end and rigidly secured thereto, said collar formed with an extension, a rod having its lower end secured to the extension, an indicator secured to the upper end of the rod, an adjusting screw threaded through the bracket and engaging the indicator and operable to set the same, and a pipe communicating with the interior of the cylinder through the upper end thereof.

2. A pressure gauge, including a support, a bracket secured to the upper end of the support, a cylinder rigidly connected to and suspended from the bracket, a pipe communicating with the interior of the cylinder through the upper end thereof, a collar encircling the lower end of the cylinder, an indicator, means connecting the indicator to the collar and means carried by the bracket for adjusting the indicator.

3. A pressure gauge, including a support, a cylinder hung from the upper end of the support and rigidly connected thereto, a pipe communicating with the interior of the cylinder through the upper end thereof, an indicator, means connecting the indicator to the lower end of the cylinder and means connected to the upper end of the cylinder for adjusting the indicator.

4. A pressure gauge, including a cylinder, a pipe communicating with the interior of the cylinder through one end thereof, an indicator, means connecting the indicator to the other end of the cylinder, and means secured to the first mentioned end of the cylinder for adjusting the indicator.

5. A pressure gauge, including a metallic cylinder subjected to pressure during working to increase the elastic limit thereof, means for admitting pressure fluid to said cylinder and means connected to the cylinder for indicating the pressure by the elongation of the cylinder.

ALBERT E. GUY.